United States Patent
Nakagawa et al.

(10) Patent No.: US 8,771,631 B2
(45) Date of Patent: Jul. 8, 2014

(54) METHOD FOR PRODUCING PEROVSKITE TYPE COMPOSITE OXIDE

(75) Inventors: Toshiharu Nakagawa, Nagaokakyo (JP); Norikazu Tachibana, Nagaokakyo (JP); Yasunari Nakamura, Kyoto-fu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/401,994

(22) Filed: Feb. 22, 2012

(65) Prior Publication Data

US 2012/0216941 A1    Aug. 30, 2012

(30) Foreign Application Priority Data

Feb. 25, 2011  (JP) ................................. 2011-039584

(51) Int. Cl.
  *C01G 23/00* (2006.01)
(52) U.S. Cl.
  USPC .......................................... 423/598; 501/136
(58) Field of Classification Search
  USPC ................................... 423/598; 501/136, 137
  See application file for complete search history.

(56) References Cited

U.S. PATENT DOCUMENTS

| | | | |
|---|---|---|---|
| 4,832,939 A | 5/1989 | Menashi et al. | |
| 7,556,792 B2 | 7/2009 | Torii et al. | |
| 2007/0253145 A1* | 11/2007 | Kurozumi et al. | 361/321.4 |

FOREIGN PATENT DOCUMENTS

| | | |
|---|---|---|
| CN | 101014539 A | 8/2007 |
| CN | 101250056 A | 8/2008 |
| JP | 63-74915 A | 4/1988 |
| JP | 2003-048774 A | 2/2003 |
| JP | 2003-252623 A | 9/2003 |
| JP | 4200427 B | 9/2003 |
| JP | 2005-008445 A | 1/2005 |
| JP | 4057475 B | 1/2005 |
| JP | 2005-162594 A | 6/2005 |
| JP | 2005-306728 A | 11/2005 |
| JP | 2006-089368 A | 4/2006 |
| JP | 2008-143735 A | 6/2008 |
| WO | WO-03/004416 A1 | 1/2003 |

OTHER PUBLICATIONS

Jayanthi, S. et al.; "Extended phase homogeneity and electrical properties of barium calcium titanate prepared by the wet chemical methods"; Materials Science and Engineering, vol. 110, Jul. 25, 2004, pp. 202-212.
Japanese Office Action for counterpart application JP 2011-039584, dispatch date Jun. 25, 2013 (with English translation).

* cited by examiner

*Primary Examiner* — Steven Bos
(74) *Attorney, Agent, or Firm* — Dickstein Shapiro LLP

(57) ABSTRACT

A method is provided which includes a reaction step of reacting at least titanium oxide, a calcium compound, and barium hydroxide in a slurry solution so as to produce a perovskite-type composite oxide. The perovskite-type composite oxide is represented by $(Ba_{1-x}Ca_x)_m TiO_3$, and x is within a range of $0<x\le0.125$. In addition, the method provides a perovskite-type composite oxide in which a water-soluble calcium compound is used as the calcium compound, and when the perovskite-type composite oxide is represented by $(Ba_{1-x}Ca_x)_m TiO_3$, x is within a range of $0<x\le0.20$.

13 Claims, 3 Drawing Sheets

METHOD FOR PRODUCING PEROVSKITE TYPE COMPOSITE OXIDE

BACKGROUND OF THE INVENTION

1. Field of the Invention

The present invention relates to a method for producing a composite oxide, and more particularly, relates to a method for producing a perovskite-type composite oxide which can be suitably used as a ceramic material for a ceramic electronic component.

2. Description of the Related Art

Barium titanate-based ceramics as one of perovskite-type composite oxides represented by the general formula $ABO_3$ have been used widely as materials which have excellent dielectric characteristics in applications such as laminated ceramic capacitors.

Further, as a method for producing a composite oxide powder which has a perovskite structure represented by the general formula $ABO_3$, for example, a method for producing a composite oxide powder has been proposed, which includes a mixing treatment step of mixing a hydroxide of an element constituting an A site component containing crystallization water with a titanium oxide powder which has a specific surface area of 250 $m^2/g$ or more, and in the method, the mixing treatment step includes a solution producing step of producing a solution with the A site component dissolved only with moisture of the crystallization water by carrying out a heat treatment, and a reaction step of reacting the titanium oxide powder with the solution to produce a reaction synthesis product, so that the solution producing step and the reaction step proceed continuously (claim 1 in Japanese Patent No. 4200427).

In addition, Japanese Patent No. 4200427 discloses the calcination of the obtained composite oxide (claim 7 in Japanese Patent No. 4200427).

Further, according to the inventive method in Japanese Patent No. 4200427, it is supposed that a composite oxide is achieved which has few heterogeneous phases, superfine grains, and excellent crystallinity, and the calcination treatment of the composite oxide can change the crystal system from the cubic composite oxide to produce a tetragonal composite oxide which is excellent in crystallinity.

In addition, as another method for producing a composite oxide, a method for producing a barium titanate powder has been proposed which includes a reaction step of adding a water-soluble barium compound to titanium oxide grains under an atmosphere in the absence of carbon dioxide at an equimolar ratio to the number of moles of the titanium oxide grains, and performing a reaction at a temperature of 100° C. or less in an aqueous solution at a pH of 11.5 or more and 13.0 or less (claim 2 in Japanese Patent No. 4057475).

According to the inventive method in Japanese Patent No. 4057475, it is supposed that a barium titanate powder which has a narrow grain size distribution can be produced economically while preventing the incorporation of chlorine impurities.

On the other hand, in laminated ceramic capacitors using a barium titanate (composite oxide)-based material as described above, the reduction in size and the increase in capacitance have been advanced, and such laminated capacitors have been put into practical use, in which dielectric layers are on the order of 1 µm in thickness and the number of dielectric layers stacked is greater than 800.

Further, in order to further reduce the laminated ceramic capacitors in size, there is a need to reduce the dielectric layers in thickness to a submicrometer area of 1 µm or less, and in order to achieve dielectric layers of submicrometer in thickness, there is a need to make the grain size of a ceramic sintered body constituting the dielectric layers fine down to 100 nm or less. To that end, an unsintered raw material powder (for example, a calcined powder of barium titanate-based material) itself for use in the formation of the dielectric layers is required to be small in grain size.

From the above point of view, while the inventive methods in Japanese Patent Nos. 4200427 and 4057475 meaningfully allow the achievement of a fine barium titanate powder, methods for efficiently producing a finer perovskite-type composite oxide with high reliability have been required actually in order to address further reduction in layer thickness in the future.

SUMMARY OF THE INVENTION

The present invention is intended to solve the problem described above, and an object of the present invention is to provide a method for efficiently and economically producing a fine and highly crystalline perovskite-type composite oxide which is able to be preferably used as, for example, a constituent material for dielectric layers in the case of producing a laminated ceramic capacitor including a large number of stacked dielectric layers (ceramic layers) reduced in layer thickness, and a method for producing a laminated ceramic capacitor with the use of a perovskite-type composite oxide produced by the method.

In order to solve the problem described above, a method for producing a perovskite-type composite oxide according to the present invention is a method for producing a perovskite-type composite oxide represented by $ABO_3$ (A includes at least Ba and Ca, whereas B includes at least Ti), the method including a reaction step of reacting at least titanium oxide, a calcium compound, and barium hydroxide in a slurry solution, thereby producing a perovskite-type composite oxide, wherein the calcium compound comprises calcium carbonate, and when the perovskite-type composite oxide is represented by $(Ba_{1-x}Ca_x)_mTiO_3$, x falls within the range of $0<x\leq0.125$.

In addition, a method for producing a perovskite-type composite oxide according to the present invention is a method for producing a perovskite-type composite oxide represented by $ABO_3$ (A includes at least Ba and Ca, whereas B includes at least Ti), the method including a reaction step of reacting at least titanium oxide, a calcium compound, and barium hydroxide in a slurry solution, wherein the calcium compound comprises a water-soluble calcium compound, and when the perovskite-type composite oxide is represented by $(Ba_{1-x}Ca_x)_mTiO_3$, x falls within the range of $0<x\leq0.20$.

In addition, in the present invention, the water-soluble calcium compound is preferably calcium acetate or calcium nitrate.

In addition, in the present invention, the method further includes a step of applying a heat treatment to the perovskite-type composite oxide produced in the reaction step.

In addition, a method for producing a laminated ceramic capacitor according to the present invention includes: a step of combining a perovskite-type composite oxide produced by the production method according to claim 4 with an additive component to prepare a ceramic green sheet raw material; a sheet preparation step of forming the ceramic green sheet raw material into a sheet, thereby preparing ceramic green sheets; a step of applying a conductive paste for the formation of internal electrodes onto the ceramic green sheets prepared in the sheet preparation step, thereby forming internal electrode patterns; a step of preparing a laminated body having a structure comprising a predetermined number of the internal electrode patterns stacked therein with the ceramic green sheets interposed therebetween, by undergoing a step of stacking a predetermined number of the ceramic green sheets with the internal electrode patterns formed thereon; and a step of firing the laminated body.

The method for producing a perovskite-type composite oxide according to the present invention includes the reaction step of reacting at least titanium oxide, a calcium compound, and barium hydroxide in a slurry solution, thereby producing a perovskite-type composite oxide, and in the method, calcium carbonate is used as the calcium compound. Thus, a perovskite-type composite oxide can be produced efficiently in which when the perovskite-type composite oxide is represented by $(Ba_{1-x}Ca_x)_mTiO_3$, x falls within the range of $0<x\leq0.125$.

More specifically, the method according to the present invention can efficiently produce a perovskite-type composite oxide which is fine, highly crystalline, and excellent in reliability.

In addition, the method for producing a perovskite-type composite oxide according to the present invention includes the reaction step of reacting at least titanium oxide, a calcium compound, and barium hydroxide in a slurry solution, and in the method, a water-soluble calcium compound is used as the calcium compound. Thus, a perovskite-type composite oxide can be produced efficiently in which when the perovskite-type composite oxide is represented by $(Ba_{1-x}Ca_x)_mTiO_3$, x falls within the range of $0<x\leq0.20$.

More specifically, the method according to the present invention can efficiently produce a perovskite-type composite oxide which is fine, highly crystalline, and excellent in reliability.

In addition, the use of calcium acetate or calcium nitrate as the water-soluble calcium compound allows the efficient production of a perovskite-type composite oxide in which when the perovskite-type composite oxide is represented by $(Ba_{1-x}Ca_x)_mTiO_3$, x falls within the range of $0<x\leq0.20$, thereby making the present invention more effective.

More specifically, as compared with the case of using $CaCO_3$ as a raw material for Ca, the use of the water-soluble calcium compound such as calcium acetate or calcium nitrate improves the reactivity, and further promotes the solid solubility of Ca into the $BaTiO_3$ lattice.

In addition, the perovskite-type composite oxide produced in the reaction step is subjected to the heat treatment, thereby making it possible to increase the c/a axial ratio and thus achieve a highly crystalline perovskite-type composite oxide.

For example, the application of a heat treatment at a temperature of 800 to 1050° C. makes it possible to achieve a tetragonal perovskite-type composite oxide which has a large c/a axial ratio (greater than 1).

In addition, in the method for producing a laminated ceramic capacitor according to the present invention, a laminated ceramic capacitor is produced by undergoing steps of applying a conductive paste for the formation of internal electrodes onto ceramic green sheets formed from a ceramic green sheet raw material including a perovskite-type composite oxide produced by the method noted above and an additive component, thereby forming internal electrode patterns, and stacking the ceramic green sheets with the internal electrode patterns formed thereon, thereby preparing a laminated body which has a structure including a predetermined number of the internal electrode patterns stacked therein with the ceramic green sheets interposed therebetween. Thus, the method makes it possible to produce, with certainty, a small and high-performance laminated ceramic capacitor which has a large number of dielectric layers reduced in thickness and stacked.

DETAILED DESCRIPTION OF THE INVENTION

An example of the present invention will be given below to describe features of the present invention in more detail.

Example 1

[1] Preparation of Perovskite-Type Composite Oxide Powder

First, the following materials (a) to (e) were prepared as raw materials for the perovskite-type composite oxide.
(a) titanium oxide ($TiO_2$) powder of 300 $m^2/g$ in specific surface area;
(b) barium hydroxide ($Ba(OH)_2$) powder of 30 $m^2/g$ in specific surface area, containing no hydration water;
(c) $CaCO_3$ powder;
(d) calcium acetate (($CH_2COO)_2Ca$) as a water-soluble calcium compound; and
(e) calcium nitrate ($Ca(NO_3)_2$) as a water-soluble calcium compound.

Then, the materials were weighed to satisfy, in the case of a chemical formula $(Ba_{1-x}Ca_x)TiO_3$, x=0, 0.025, 0.05, 0.075, 0.1, 0.125, 0.15, 0.175, 0.2, and 0.25.

It is to be noted that the respective raw materials (c), (d), and (e) mentioned above were used selectively as the raw material for calcium.

Then, the weighed titanium oxide ($TiO_2$) powder was put in a 5-liter glass container with a predetermined amount of pure water input, to prepare a slurry in which the content ratio of titanium oxide ($TiO_2$) was 20 weight %.

Next, while stirring the obtained slurry, the respective Ca compounds (c), (d), and (e) were selectively added.

Then, the slurry was heated, to which the barium hydroxide ($Ba(OH)_2$) powder was input once the slurry temperature reached 70° C., and the mixture was reacted while stirring at 85° C. or more for 1 hour.

Next, the obtained slurry was evacuated and dried by a dryer. Then, the dried powder was subjected to a heat treatment at a temperature of 1050° C. to obtain a barium titanate powder (perovskite-type composite oxide powder) modified with calcium.

For the obtained barium titanate powder, X-ray diffractometry (XRD) was used to measure the lattice constant, and calculate the lattice volume. The result is shown in FIG. 1.

Figure 1:
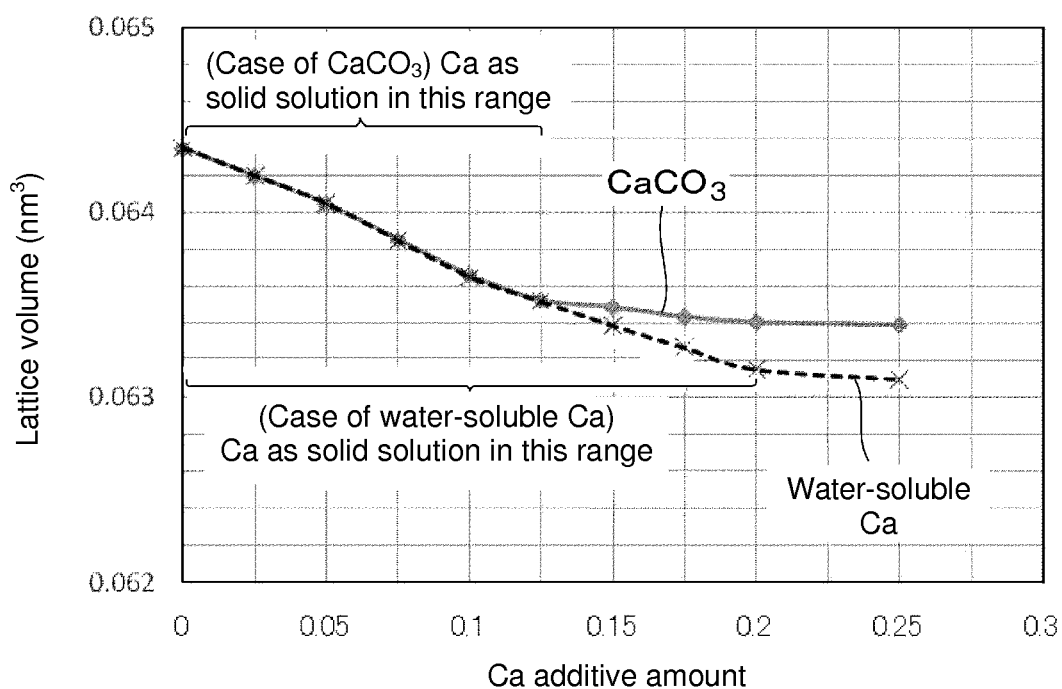
FIG. 1 is a diagram showing a relationship between the Ca substitution amount (Ca additive amount) and lattice volume in the case of substituting some of Ba at an A site with Ca in a perovskite-type composite oxide produced according to an example of the present invention.

As shown in FIG. 1, the lattice volume is decreased with an increase in the amount of Ca in a solid solution, in any of the case of using $CaCO_3$ as the raw material for Ca and of using the water-soluble Ca as the raw material for Ca. This is due to a decrease in lattice volume as a whole with an increase in the amount of Ca in a solid solution (the substitution amount of Ca), because the ionic radius of Ba is 1.61 angstrom, whereas the ionic radius of Ca is smaller and 1.34 angstrom.

However, when $CaCO_3$ was used as the raw material for Ca, the lattice amount was decreased until the additive amount of Ca reached 0.125 in terms of molar ratio in the case of 1 for the total amount of Ba and Ca. On the other hand, when the additive amount of Ca was further increased, the decreasing trend of the lattice volume was declined drastically. Thus, it has been confirmed that the solid solubility limit is 0.125 (Ca/(Ba+Ca)) in terms of molar ratio in the case of using $CaCO_3$ as the raw material for Ca.

More specifically, it has been confirmed that, when the perovskite-type composite oxide is represented by $(Ba_{1-x}Ca_x)_m TiO_3$, Ca is present in $BaTiO_3$ as a solid solution in the range of $0<x\leq0.125$ for x.

In addition, from FIG. 1, it has been confirmed that the solid solubility limit is increased up to 0.20 (Ca/(Ba+Ca)) in terms of molar ratio in the case of using the water-soluble calcium compound (calcium acetate $((CH_3COO)_2Ca)$ or calcium nitrate $(Ca(NO_3)_2)$) as the raw material for Ca.

More specifically, when the perovskite-type composite oxide is represented by $(Ba_{1-x}Ca_x)_m TiO_3$, Ca is present in $BaTiO_3$ as a solid solution in the range of $0<x\leq0.20$ for x.

This is considered to be because the use of the water-soluble calcium compound such as calcium acetate or calcium nitrate as the raw material for Ca improves the reactivity as compared with the case of using $CaCO_3$ as the raw material for Ca, thus increasing the amount of Ca in the $BaTiO_3$ lattice as a solid solution.

[2] Preparation of Laminated Ceramic Capacitor

The perovskite-type composite oxide (barium titanate modified with Ca) prepared in the way described above was used as a raw material for dielectric layers (ceramic layers) to prepare a laminated ceramic capacitor.

First, MgO, $Dy_2O_3$, $SiO_2$, and $MnCO_3$ were each weighed as additives to provide MgO: 1.0 mol; $Dy_2O_3$: 0.8 mol; $SiO_2$: 1.3 mol; and $MnCO_3$: 0.05 mol with respect to 100 mol of the barium titanate powder prepared in the way described above, and added thereto.

In addition, $BaCO_3$ for the adjustment of the molar ratio was added so that the A/B ratio was 1.007.

Then, these combined materials, an organic binder (a polyvinyl butyral resin in this example), and an organic solvent (ethanol in this example) were input in a ball mill, and subjected to mixing and grinding with the use of PSZ media of 2 mm in diameter.

Next, sheet forming was carried out by using a doctor blade method so that the sheet thickness was 0.8 μm after firing, and this sheet was subjected to punching into a predetermined size to obtain rectangular ceramic green sheets.

Next, a conductive paste for the formation of internal electrodes, which contained Ni as its main constituent, was prepared, and applied by screen printing onto the ceramic green sheets described above, thereby forming internal electrode patterns to serve as internal electrodes after firing.

Then, a predetermined number of the ceramic green sheets including the internal electrode patterns were stacked in a predetermined order, on which ceramic green sheets with no internal electrode patterns formed were stacked as the outermost layers, and then the resultant was subjected to pressure bonding to prepare a pressure-bonded block.

Figure 2:
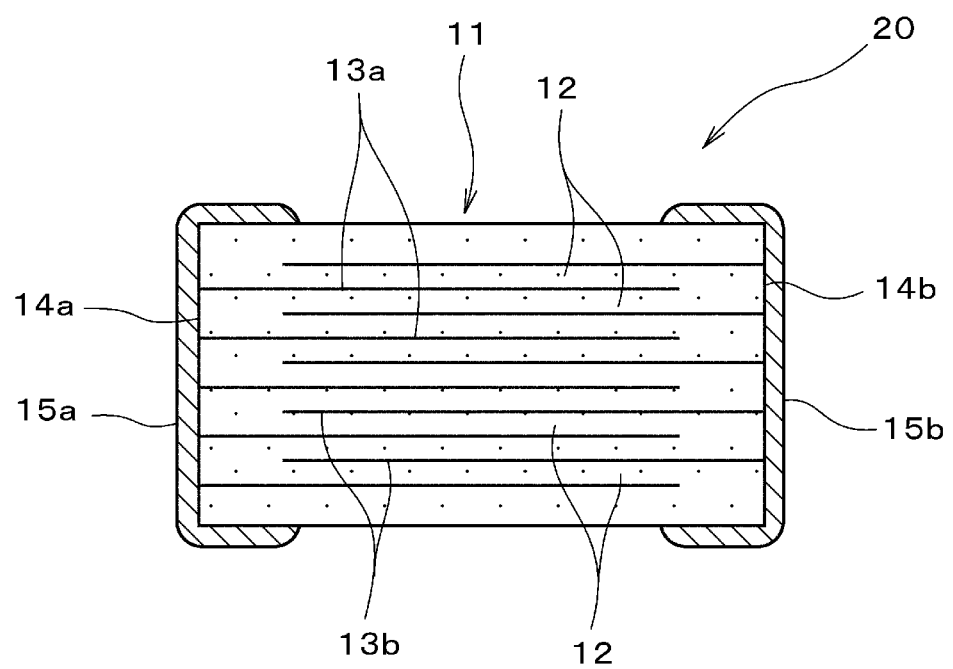
FIG. 2 is a cross-sectional view illustrating the structure of a laminated ceramic capacitor using a perovskite-type composite oxide according to the present invention for dielectric layers.

Then, a laminated body obtained by cutting this pressure-bonded block was subjected to firing under a predetermined condition, and a conductive paste for the formation of external electrodes was then applied onto the fired laminated body, and subjected to firing, thereby preparing a laminated ceramic capacitor 20 having a structure as shown in FIG. 2.

It is to be noted that this laminated ceramic capacitor 20 has a structure in which a laminated ceramic element 11 has therein a plurality of internal electrodes 13a and 13b stacked with ceramic layers (dielectric layers) 12 interposed therebetween, and the internal electrodes 13a and 13b opposed to each other are extracted alternately to end surfaces 14a and 14b on different sides of the laminated ceramic element 11, and connected to external electrodes 15a and 15b formed on the end surfaces 14a and 14b.

Further, in this example, the laminated ceramic capacitor 20 was adjusted to 0.8 μm in element thickness (the thickness for the ceramic layers 12 located between the internal electrodes 13a and 13b opposed to each other), and the number of dielectric layers 12 stacked was adjusted to 100.

[Evaluation]

Figure 3:
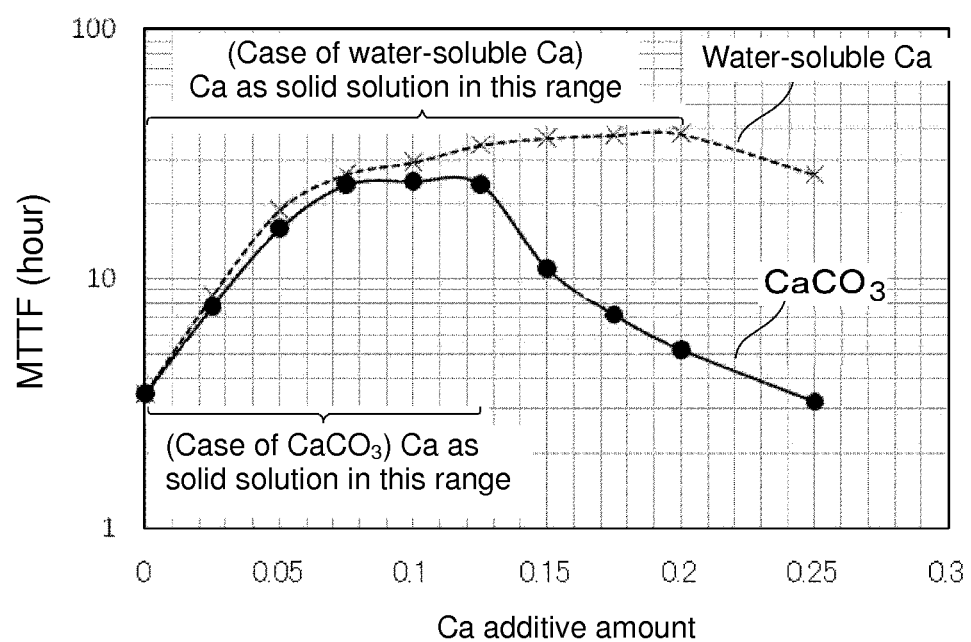
FIG. 3 is a diagram showing a relationship between the Ca substitution amount (Ca additive amount) in a perovskite-type composite oxide according to the present invention and the mean time to failure (MTTF), for a laminated ceramic capacitor using the perovskite-type composite oxide for dielectric layers.

A highly accelerated life test (HALT) was carried out in such a way that a direct-current voltage of 24 V was applied at an ambient temperature of 175° C. to the laminated ceramic capacitors prepared in the way described above. The time until the insulation resistance (Log IR) was decreased down to 100 kΩ was considered as time to failure to calculate the mean time to failure (MTTF). The result is shown in Table 1 and FIG. 3.

It is to be noted that the value of the Ca additive amount indicates the ratio of Ca to the total amount of Ba derived from $Ba(OH)_2$ as a raw material for Ba and the added Ca, that is, Ca/(Ba+Ca) (molar ratio) in Table 1.

In addition, in Table 1, the "case of using water-soluble Ca as raw material for Ca" indicates the cases of using (d) calcium acetate $((CH_3COO)_2Ca)$ as a water-soluble calcium compound and (e) calcium nitrate $(Ca(NO_3)_2)$ as a water-soluble calcium compound, which are collectively shown in Table 1 as "case of using water-soluble Ca as raw material for Ca", because the same result was obtained regarding the mean time to failure (MTTF) in any of the cases of using the water-soluble calcium compound (d) and (e).

TABLE 1

| Ca additive amount | MTTF in the case of using $CaCO_3$ as raw material for Ca (hr) | MTTF in the case of using water-soluble Ca as raw material for Ca (hr) |
| --- | --- | --- |
| 0 | 3.5 | 3.5 |
| 0.025 | 7.8 | 8.6 |
| 0.05 | 15.9 | 18.9 |
| 0.075 | 23.9 | 26.3 |
| 0.1 | 24.7 | 29.4 |
| 0.125 | 24.0 | 34.5 |
| 0.15 | 11.0 | 36.8 |
| 0.175 | 7.2 | 37.8 |
| 0.2 | 5.2 | 38.2 |
| 0.25 | 3.2 | 26.2 |

As shown in Table 1, it is determined that in any of the case of using $CaCO_3$ as a raw material for Ca and the case of using water-soluble Ca as a raw material for Ca, the value of the mean time to failure (MTTF) is increased with an increase in the amount of Ca in a solid solution to improve the reliability (durability).

This is considered to be because the Ca at the A site (Ba site) of the perovskite-type composite oxide (BaTiO$_3$ in this example) represented by ABO$_3$ in a solid solution causes lattice distortion and suppresses movements such as oxygen defects, thereby improving the stability and making the mean time to failure (MTTF) longer.

However, in the case of using CaCO$_3$ as a raw material for Ca, the amount of Ca in the perovskite-type composite oxide (BaTiO$_3$) as a solid solution reaches a ceiling at 0.125 (Ca/(Ba+Ca)) (12.5 mol %) in terms of molar ratio as described previously with reference to FIG. 1. Thus, in the case of adding CaCO$_3$ over 12.5 mol %, Ca will be present which is not in a solid solution, and it has been confirmed that the mean time to failure (MTTF) is shortened conversely to decrease the reliability.

On the other hand, in the case of using water-soluble Ca((CH$_3$COO)$_2$Ca or Ca(NO$_3$)$_2$) as a raw material for Ca, the increased amount of Ca in a solid solution more than in the case of using CaCO$_3$ as a raw material for Ca makes Ca up to 0.20 (Ca/(Ba+Ca)) (20 mol %) in terms of molar ratio in the solid solution, as described previously with reference to FIG. 1. Thus, it has been confirmed that until the Ca additive amount reaches 20 mol %, the mean time to failure (MTTF) is increased to improve the reliability.

It is to be noted that while Ba(OH)$_2$ including no hydration water and remaining as a solid is used as barium hydroxide, and added directly to a slurry with TiO$_2$ or the like dispersed therein in this example, in the case of adding Ba(OH)$_2$ including no hydration water and remaining as a solid to a slurry at 70° C. as described above, the heat of solution raises the temperature of the slurry rapidly to around 100° C. to promote the synthesis reaction.

Therefore, it is preferable to use barium hydroxide containing no hydration water as a Ba source. However, it will be obvious that it is also possible to use barium hydroxide containing hydration water.

It is to be noted that the present invention is not to be considered limited to the example described above, and a variety of changes and modifications can be made within the scope of the invention in the solid content concentration of the titanium oxide slurry with the titanium oxide powder dispersed in water, the conditions such as the reaction temperature and the reaction time in the case of adding and reacting barium hydroxide to and with the titanium oxide slurry, the range in specific surface area of the titanium oxide powder as a raw material, the substitution ratio in the case of substituting some of A site with Ca, the conditions in the case of applying a heat treatment to the perovskite-type composite oxide produced in the reaction step, specific conditions in the case of producing a laminated ceramic capacitor, etc.

What is claimed is:

1. A method for producing a perovskite composite oxide represented by ABO$_3$, wherein A comprises Ba and Ca, the amount of Ca is up to 0.125 moles based on the total moles of Ba and Ca, and B comprises Ti, the method comprising: reacting titanium oxide, calcium carbonate, and barium hydroxide in a slurry so as to produce a perovskite composite oxide.

2. The method for producing a perovskite composite oxide according to claim 1, further comprising applying a heat treatment to the perovskite composite oxide.

3. The method for producing a perovskite composite oxide according to claim 2, wherein the heat treatment is applied at a temperature of 800° C. to 1050° C.

4. The method for producing a perovskite composite oxide according to claim 2, wherein the heat treatment is applied so as to produce a tetragonal perovskite composite oxide.

5. A method for producing a perovskite composite oxide represented by ABO$_3$, wherein A comprises Ba and Ca, the amount of Ca is up to 0.125 moles based on the total moles of Ba and Ca, and B comprises Ti, the method comprising: reacting titanium oxide, a water-soluble calcium compound having a water solubility of calcium acetate or greater, and barium hydroxide in a slurry so as to produce a perovskite composite oxide.

6. The method for producing a perovskite composite oxide according to claim 5, wherein the water-soluble calcium compound is calcium acetate or calcium nitrate.

7. The method for producing a perovskite composite oxide according to claim 5, further comprising applying a heat treatment to the perovskite composite oxide.

8. The method for producing a perovskite composite oxide according to claim 7, wherein the heat treatment is applied at a temperature of 800° C. to 1050° C.

9. The method for producing a perovskite composite oxide according to claim 7, wherein the heat treatment is applied so as to produce a tetragonal perovskite composite oxide.

10. The method for producing a perovskite composite oxide according to claim 5, wherein the amount of Ca is at least 0.075 moles based on the total moles of Ba and Ca.

11. The method for producing a perovskite composite oxide according to claim 10, comprising applying a heat treatment at a temperature of 800° C. to 1050° C. to the perovskite-type composite oxide.

12. The method for producing a perovskite composite oxide according to claim 1, wherein the amount of Ca is 0.05 to 0.15 moles based on the total moles of Ba and Ca.

13. The method for producing a perovskite composite oxide according to claim 12, comprising applying a heat treatment at a temperature of 800° C. to 1050° C. to the perovskite composite oxide.

* * * * *